United States Patent
Morrison et al.

(10) Patent No.: US 10,475,208 B1
(45) Date of Patent: Nov. 12, 2019

(54) VEHICLE ANALYSIS PLATFORM

(71) Applicant: Capital One Services, LLC, McLean, VA (US)

(72) Inventors: Mark Morrison, Rowlett, TX (US); Prasad Pathapati, Frisco, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/401,809

(22) Filed: May 2, 2019

(51) Int. Cl.
*G06T 7/73* (2017.01)
*G06Q 30/02* (2012.01)
*G06K 9/00* (2006.01)
*G06N 20/00* (2019.01)

(52) U.S. Cl.
CPC ............ *G06T 7/74* (2017.01); *G06K 9/00771* (2013.01); *G06N 20/00* (2019.01); *G06Q 30/0278* (2013.01); *G06T 2207/20081* (2013.01); *G06T 2207/30248* (2013.01)

(58) Field of Classification Search
CPC ...... G06K 9/00771; G06T 2207/20081; G06T 2207/30248; G06T 7/74; G06N 20/00; G06Q 30/0278
USPC ......................................................... 381/103
See application file for complete search history.

(56) References Cited

U.S. PATENT DOCUMENTS

| | | |
|---|---|---|
| 9,799,058 B2 | 10/2017 | Gill |
| 2002/0128985 A1 | 9/2002 | Greenwald |
| 2006/0114531 A1* | 6/2006 | Webb ................. G01N 21/8806 359/15 |

FOREIGN PATENT DOCUMENTS

WO 97/07380 A2 2/1997

OTHER PUBLICATIONS

Headquarter Micro-Epsilon America, "Fully automatic surface inspection of painted car bodies", Jun. 8, 2011, 3 pages.

* cited by examiner

*Primary Examiner* — Paul Kim
(74) *Attorney, Agent, or Firm* — Harrity & Harrity, LLP

(57) ABSTRACT

A vehicle analysis platform may cause one or more image capture devices to capture a plurality of images. The vehicle analysis platform may cause one or more sensors to provide measurement data associated with one or more operational characteristics of a vehicle. The vehicle analysis platform may determine, based on the plurality of images, one or more features of the vehicle and obtain, based on the one or more features, reference information associated with the vehicle. The vehicle analysis platform may analyze the vehicle based on the plurality of images and the reference information to determine an image score associated with the vehicle. The vehicle analysis platform may analyze the vehicle based on the measurement data and the reference information to determine an operational score associated with the vehicle. The vehicle analysis platform perform an action associated with the vehicle based on the image score and the operational score.

20 Claims, 8 Drawing Sheets

VEHICLE ANALYSIS PLATFORM

BACKGROUND

A vehicle is generally used for transportation of people and/or goods. Throughout the useful life of the vehicle, the vehicle may be owned by various different entities (e.g., individuals, dealerships, organizations, freelancers, and/or the like). Furthermore, throughout the useful life of the vehicle, various parts or components of the vehicle may experience wear, expire, and/or the like. In some instances, the vehicle may be involved in one or more collisions, may be the subject of unlawful activity (e.g., break in, theft, and/or the like), may be damaged, and/or the like.

SUMMARY

According to some implementations, a method may include detecting, by a device, that a vehicle is in an inspection bay, wherein the vehicle is running in the inspection bay; causing, by the device and based on detecting that the vehicle is in the inspection bay, an image capture device of the inspection bay to capture a plurality of images of the vehicle, wherein the plurality of images are captured from a plurality of different angles based on dimensions of the vehicle; determining, by the device and from an image analysis of the plurality of images, one or more features of the vehicle; obtaining, by the device and based on the one or more features, reference information associated with the vehicle; comparing the reference information with the received plurality of images to detect variances; determining, using a first machine learning model and based on the detected variances, a first score associated with the vehicle, wherein the first score is representative of a visual condition of the vehicle; receiving, by the device and from one or more sensors, measurement data associated with the vehicle; determining, by the device and using a second machine learning model, based on the measurement data and the reference information, a second score associated with the vehicle, wherein the second score is representative of an operational condition of the vehicle; determining, by the device and using a third machine learning model, a vehicle condition score for the vehicle based on the first score and the second score, wherein the vehicle condition score is representative of an overall condition of the vehicle, and wherein the third machine learning model is trained based on historical information associated with determining a condition of a plurality of vehicles based on a plurality of first scores and a plurality of second scores; and performing, by the device, an action associated with the vehicle based on the vehicle condition score.

According to some implementations, a device may include one or more memories; and one or more processors, communicatively coupled to the one or more memories, configured to: a memory; and one or more processors operatively coupled to the memory, the memory and the one or more processors configured to: receive, from an image capture device, a plurality of images of a vehicle; identify, from the plurality of images, reference information associated with the vehicle; determine, based on the reference information and using a first machine learning model, a first score associated with the vehicle based on a visual condition of the vehicle, wherein the visual condition is represented in the plurality of images; receive, from one or more sensors, measurement data associated with the vehicle; determine, based on the reference information and using a second machine learning model, a second score associated with the vehicle based on an operational condition of the vehicle, wherein the operational condition of the vehicle is represented in the measurement data; determine, using a third machine learning model, a vehicle condition score for the vehicle based on the first score and the second score, wherein the vehicle condition score is representative of an overall condition of the vehicle; and perform an action associated with the vehicle based on the vehicle condition score.

According to some implementations, a system configured to analyze a vehicle may include one or more image capture devices configured to capture a plurality of images of the vehicle; one or more sensors configured to detect one or more operational characteristics of the vehicle; and one or more control devices configured to: cause the one or more image capture devices to capture the plurality of images; cause the one or more sensors to provide measurement data associated with the one or more operational characteristics; determine, based on the plurality of images, one or more features of the vehicle; obtain, based on the one or more features, reference information associated with the vehicle; analyze, using a machine learning model, the vehicle based on the plurality of images and the reference information to determine an image score associated with the vehicle; analyze, using the machine learning model, the vehicle based on the measurement data and the reference information to determine an operational score associated with the vehicle; determine, using the machine learning model, a vehicle condition score associated with the vehicle based on the image score and the operational score, wherein the machine learning model is trained based on the one or more features, the reference information, and historical data associated with a plurality of vehicle condition scores for a plurality of vehicles; and perform an action associated with the vehicle based on the vehicle condition score.

DETAILED DESCRIPTION

Figure 1A:
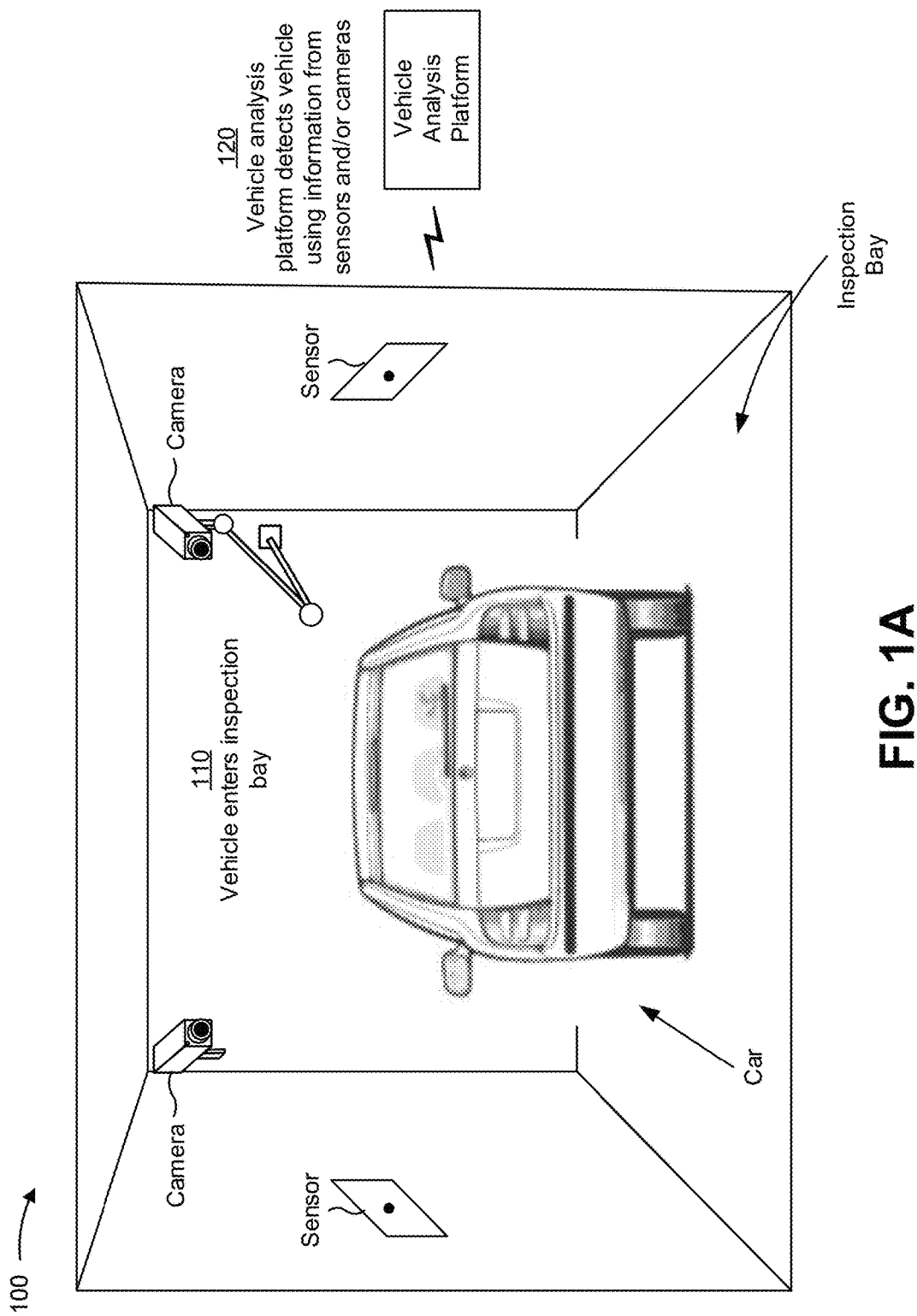
FIGS. 1A, 1B and 2 are diagrams of one or more example implementations described herein.

The following detailed description of example implementations refers to the accompanying drawings. The same reference numbers in different drawings may identify the same or similar elements.

In many instances, an analysis of a vehicle is performed to determine a condition of the vehicle. Such a condition may be used in determining a value (e.g., a monetary value) associated with the vehicle, an operability of the vehicle (or one or more components of the vehicle), and/or the like. The analysis is generally performed by an entity (or a representative of the entity, such as a mechanic, a salesperson, and/or the like) and using various tools, and information (e.g., a report indicating the value and/or operability of the vehicle) associated with the analysis may be stored and/or maintained as proprietary information. Moreover, such a condition (or a value or operability) may be based on subjective standards of the entity, and thus a determined condition and/or indicated condition based on the analysis may be relatively inaccurate and/or misleading to one or more parties. In such cases, reliance on an inaccurate or misleading condition can result in certain tragic events associated with the vehicle (e.g., collisions or accidents caused by undetected faulty components of the vehicle, loss of financial resources used to purchase inoperable or undervalued vehicles, and/or the like).

In some instances, the analysis is based on information from one or more distributed platforms (e.g., a value analysis platform, market analysis platform, and/or the like). In such cases, the entity, for each vehicle analysis, may request and/or obtain the information from the one or more distributed platforms. When considering the number of vehicle analyses that may be performed by the entity and/or that may involve such distributed platforms, a plurality of computing resources (e.g., memory resources, processor resources, and/or the like) and/or communication resources (e.g., network resources, bandwidth, and/or the like) may be consumed to collect and/or provide the information associated with the distributed platforms. In some instances, such distributed platforms may not be easily accessible (e.g., difficult to find, navigate to, subscribe to, and/or the like), thus requiring additional resources to obtain the information to determine the condition of the vehicle.

According to some implementations described herein, a vehicle analysis platform is capable of performing a real-time, objective analysis of a vehicle to determine a condition of the vehicle using measurements from one or more sensors and/or images of the vehicle. The condition of the vehicle may be based on a visual condition of the vehicle and/or an operational condition of the vehicle, as determined from the measurements and/or images. In some implementations, the vehicle analysis platform may utilize and/or control one or more mechanical devices of an inspection bay to obtain the measurements and/or the images. For example, the vehicle analysis platform may detect a vehicle in the inspection bay, control the one or more mechanical devices to position sensors and/or image capture devices to optimally (e.g., according to a model of the vehicle analysis platform) obtain the measurements and/or capture the images. In some implementations, the vehicle analysis platform may perform one or more actions associated with the vehicle and/or the condition of the vehicle, such as generate a report, initiate a transaction associated with the vehicle, control the vehicle (e.g. control an autonomous or semi-autonomous operation of the vehicle), and/or the like. In this way, an objective analysis of a vehicle can be performed to determine the condition of the vehicle, as described herein.

As used herein, the term "make/model" is used to reference a particular manufacturer (or brand) of a vehicle, a chassis type, a body type, a trim package (or feature package), a year of manufacture of the vehicle, and/or the like. As described herein, the vehicle analysis platform may use one or more artificial intelligence techniques, such as machine learning, deep learning, and/or the like to determine a condition of a vehicle. The one or more artificial intelligence techniques may be implemented via one or more models of the vehicle analysis platform (referred to herein individually as a "model" and collectively as "models"). The models of the vehicle analysis platform may be configured to analyze particular characteristics (e.g., visual characteristics, mechanical characteristics, operational characteristics, and/or the like) of the vehicle to determine the condition of the vehicle. The models may be trained to identify, compare, and/or analyze the particular characteristics relative to a training data set corresponding to the particular characteristics, as described herein.

In some implementations, the vehicle analysis platform may identify characteristics associated with an appearance of a vehicle (e.g., a visual condition) and/or an operability of the vehicle (e.g., an operational condition), as described herein. Based on applying a rigorous process to analyze images of features, analyze performance measurements, and/or the like, the vehicle analysis platform enables recognition and/or identification of thousands or millions of characteristics for thousands or millions of makes/models of vehicles, thereby increasing an accuracy and consistency of determining the condition of a particular vehicle (e.g., based on a visual condition and/or an operational condition of the vehicle).

In some implementations, the vehicle analysis platform may determine whether a vehicle is to be analyzed or can be analyzed, as described herein. For example, using reference information (e.g., manufacturer information, market information, standard images, and/or the like) associated with a plurality of vehicles, the vehicle analysis platform may determine whether a condition of a particular vehicle can be determined. If the reference information indicates that the vehicle can be analyzed (e.g., because the vehicle can be identified from the reference information), the vehicle analysis platform may perform a vehicle analysis of the vehicle as described herein. On the other hand, if the vehicle analysis platform determines that the particular vehicle cannot be analyzed (e.g., because the reference information does not include any information corresponding to the vehicle), the vehicle analysis platform may generate and/or update a model for vehicle analysis to permit the vehicle analysis platform to analyze the vehicle. For example, the vehicle analysis platform may train a model (e.g., specifically to analyze the vehicle or a make/model of the vehicle) using information that includes a plurality of images of similar vehicles (e.g., which can be retrieved or obtained based on identification information associated with the vehicle), a plurality of mechanical characteristics of similar vehicles (e.g., as measurable from sounds, vapors (as detectable from gas sensors), and/or the like), a plurality of operational characteristics of similar vehicles (e.g., as measurable by one or more sensor measurements described herein), and/or the like. The vehicle analysis platform may use the model to determine a condition of the vehicle.

In some implementations, the vehicle analysis platform may perform a data preprocessing operation when generating the model for vehicle analysis using a set of analysis data. The set of analysis data may be any data (e.g., image data, measurement data, and/or the like) used to identify a vehicle and/or determine a condition of the vehicle. More specifically, the set of analysis data may include images, measurements, specification information (or other text data), and/or other types of data that are associated with hundreds, thousands, or millions of different vehicles. The vehicle analysis platform may preprocess (e.g., filter, sort, and/or the like) the set of analysis data by removing non-ASCII characters, white spaces, unidentifiable data (or images), and/or the like and/or organizing the set of analysis data (e.g., by make/model, vehicle type, location associated with the vehicles, and/or the like). In this way, the vehicle analysis platform may organize thousands, millions, or billions of data items for model generation, model updating, and/or machine learning.

In some implementations, the vehicle analysis platform may perform a training operation when generating the model for vehicle analysis. For example, the vehicle analysis platform may portion the set of analysis data into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the vehicle analysis platform may preprocess and/or perform dimensionality reduction to reduce the set of analysis data to a minimum feature set (e.g., that corresponds to a particular make/model of a vehicle, a particular type of the vehicle, and/or the like). In some implementations, the vehicle analysis platform may train the model for vehicle analysis on this minimum feature set, thereby reducing processing requirements associated with training the machine learning model, and may apply a classification technique, to the minimum feature set.

In some implementations, the vehicle analysis platform may use a classification technique, such as a logistic regression classification technique, a random forest classification technique, a gradient boosting machine learning (GBM) technique, and/or the like, to determine a categorical outcome (e.g., that a particular vehicle has a particular vehicle condition, that a particular vehicle does not have a particular vehicle condition, and/or the like). Additionally, or alternatively, the vehicle analysis platform may use a naïve Bayesian classifier technique. In this case, the vehicle analysis platform may perform binary recursive partitioning to split the data of the minimum feature set into partitions and/or branches and use the partitions and/or branches to perform predictions (e.g., that a particular vehicle likely has or is going to have a particular vehicle condition, that a particular vehicle likely does not have or likely will not have a particular vehicle condition, and/or the like). Based on using recursive partitioning, the vehicle analysis platform may reduce utilization of computing resources relative to linear sorting and/or linear analysis of data points, thereby enabling efficient use of thousands, millions, or billions of data points to train a model, which may result in a more accurate model than using fewer data points (e.g., which may be used to conserve processing resources).

Additionally, or alternatively, the vehicle analysis platform may use a support vector machine (SVM) classifier technique to generate a non-linear boundary between data points in the set of analysis data. In this case, the non-linear boundary is used to classify test data (e.g., data relating a condition of the vehicle) into a particular class. For example, a class may indicate that the vehicle has a particular visual condition (e.g., good, fair, bad, and/or the like), a class may indicate that the vehicle has a particular operational condition (e.g., operable, semi-operable, inoperable, and/or the like), and/or the like.

Additionally, or alternatively, when the test data includes image data, video data, and/or the like (e.g., images of standard and/or references makes/models of vehicles), the vehicle analysis platform may use a computer vision technique, such as a convolutional neural network technique, to assist in classifying test data (e.g., data relating to a particular make/model of a vehicle, data relating to a particular condition of a vehicle, and/or the like) into a particular class. For example, the class may indicate that a vehicle is a particular make/model (and/or that the vehicle is a modified version of a particular make model), that the vehicle is not a particular make/model, and/or the like. As another example, the class may indicate whether the vehicle has a threshold blemish area (e.g., an area of the vehicle that includes scratches, dents, deterioration, and/or the like), a type of blemish (e.g., a particular dented component, scratched component, and/or the like), and/or the like. In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the vehicle analysis platform may train the model for vehicle analysis using a supervised training procedure that includes receiving feedback to the model (e.g., from a user, from another model used to analyze the vehicle, and/or the like). The supervised training procedure may reduce an amount of time, an amount of processing resources, and/or the like to train the model for vehicle analysis relative to using an unsupervised training procedure. In some implementations, the vehicle analysis platform may use one or more other model training techniques, such as a neural network technique, a latent semantic indexing technique, and/or the like. For example, the vehicle analysis platform may perform an artificial neural network processing technique (e.g., using a two-layer feedforward neural network architecture, a three-layer feedforward neural network architecture, and/or the like) to perform pattern recognition with regard to patterns of whether characteristics (e.g., makes/models, visual characteristics, mechanical characteristics, operational characteristics, and/or the like) of vehicles described using different semantic descriptions or captured in different images can be used to identify the vehicle and/or determine a condition of the vehicle. In this case, using the artificial neural network processing technique, the vehicle analysis platform may enable the model for vehicle analysis to be robust to noisy, imprecise, or incomplete data.

In some implementations, the vehicle analysis platform may use a multi-label classification technique to train the model. For example, the vehicle analysis platform may map certain features to makes/models of vehicles. In this case, the features may be characterized as associated with a particular condition or not associated with a particular condition based on characteristics of the features (e.g., whether a logo on the vehicle is similar or associated with a logo of the make/model) and a corresponding analysis of the features (e.g., which may have been previously performed by a user or other model). Additionally, or alternatively, the vehicle analysis platform may determine classifier chains, whereby labels of target variables may be correlated (e.g., in this example, labels may be features and correlation may refer to a common make/model of a vehicle). In this case, the vehicle analysis platform may use an output of a first label as an input for a second label (as well as one or more inputs, which may be other information (e.g., reference information) relating to the make/model of the vehicle), and may determine a likelihood that particular features that include a set of characteristics (some of which are associated with the make/model of the vehicle and some of which are not associated with the particular make/model of the vehicle) are associated with the particular make/model of a vehicle based on a similarity to other features that include similar characteristics (e.g., similar appearances, identifiers, and/or the like). In this way, the vehicle analysis platform transforms classification from a multilabel-classification problem to multiple single-classification problems, thereby reducing processing utilization.

Furthermore, in some implementations, the vehicle analysis platform may determine a Hamming Loss Metric relating to an accuracy of a label in performing a classification by using the validation set of the data. For example, an accuracy with which a weighting applied to each feature and whether each feature is associated with a make/model of a vehicle or not, results in a correct prediction of whether a particular vehicle is a particular make/model, thereby accounting for differing amounts to which association of any one feature influences identification of the make/model of the vehicle. Finally, the vehicle analysis platform may finalize the model based on labels that satisfy a threshold accuracy associated with the Hamming Loss Metric and may use the model for subsequent prediction of whether features of a make/model are to result in identifying a particular make/model of a vehicle being analyzed by the vehicle analysis platform.

Similar to the above analysis of features to determine makes/models of vehicles, the vehicle analysis platform may similarly use characteristics of vehicles (e.g., features, blemishes, measurement data, and/or the like) to determine conditions of vehicles (e.g., visual conditions, operational conditions, and/or the like). For example, the vehicle analysis platform may map characteristics of vehicles to conditions of vehicles, determine classifier chains, determine an accuracy associated with the characteristics and conditions, and finalize the model according to the accuracy.

In some implementations, one or more models for vehicle analysis described herein may be trained by one or more other devices or platforms other than the vehicle analysis platform. In such cases, the one or more other devices and/or platforms may provide a trained model for vehicle analysis to the vehicle analysis platform to permit the vehicle analysis platform to use the one or more models for vehicle analysis, as described herein.

Accordingly, as described herein, the vehicle analysis platform may use one or more artificial intelligence techniques, machine learning techniques, and/or the like to detect, analyze, and determine a condition of a vehicle.

Figure 1B:
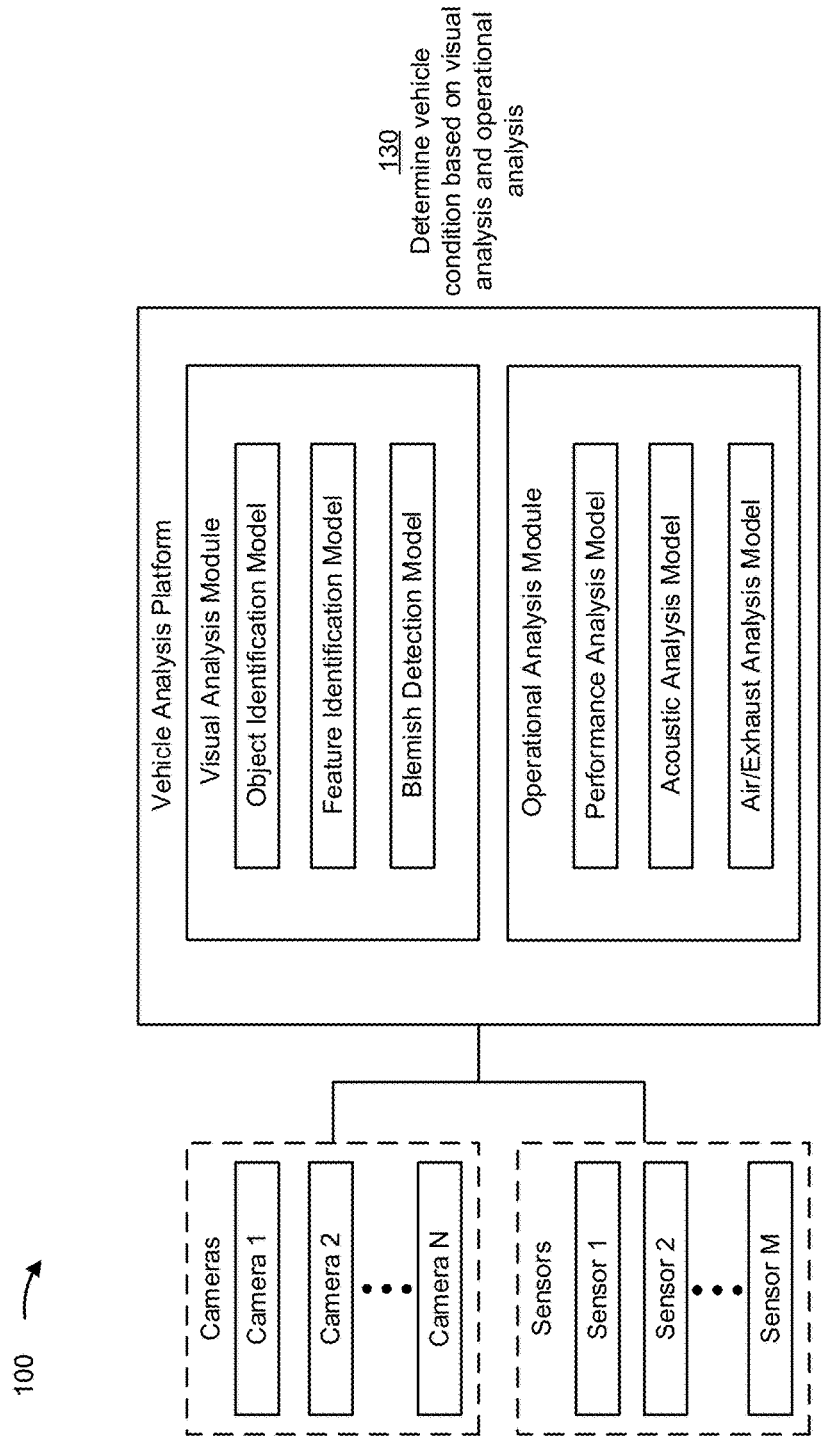

FIGS. 1A and 1B are diagrams of one or more example implementations 100 described herein. Example implementation(s) 100 include an inspection bay, one or more vehicle analysis components (shown as sensors and cameras), one or more mechanical devices (referred to individually as a "mechanical device" and collectively as "mechanical devices"), and a vehicle analysis platform. As described herein, the vehicle analysis platform may control the mechanical devices to adjust corresponding locations of the vehicle analysis components, obtain measurements and/or images associated with a vehicle in the inspection bay, determine a condition of the vehicle (e.g., a visual condition, an operational condition, and/or the like) based on the measurements and/or the images, and perform an action based on determining the condition of the vehicle. For example, based on the determined condition of the vehicle, the vehicle analysis platform may control an operation of the vehicle, initiate a transaction associated with the vehicle, generate and/or transmit a report associated with the condition, send a notification associated with the condition, and/or the like.

As shown in FIG. 1A, the inspection bay may include one or more sensors (referred to individually as a "sensor" and collectively as "sensors"). The sensors may include one or more types of sensors. For example, the sensors may include one or more motion sensors, infrared sensors, microphones (capable of detecting vibrations and/or audio within the inspection bay), temperature sensors, gas sensors (e.g., air content sensors), dynamometers, pressure sensors, and/or the like. As described herein, the one or more sensors may be used to detect the presence of the vehicle in the inspection bay, measure one or more mechanical characteristics of the vehicle (e.g., from measured sounds, measured vapors, and/or the like), measure one or more operational characteristics of the vehicle (e.g., emissions output, power output, and/or the like), and/or the like. Furthermore, the inspection bay may include one or more cameras (referred to individually as a "camera" and collectively as "cameras"). The one or more cameras may be any suitable image capture device configured to capture images of the vehicle in the inspection bay. For example, the camera may include or be associated with one or more image capture devices of an imaging system (e.g., digital imaging system, a laser imaging system, a radar imaging system, sonar imaging system, infrared imaging system, and/or the like) that may be used to capture and/or generate images of the inspection bay and/or contents of the inspection bay (e.g., a vehicle, components of a vehicle, and/or the like).

The sensors and/or cameras of example implementation(s) 100 may be stationary (e.g., mounted to directly to a support structure of the inspection bay) and/or movable via one or more of the mechanical devices as described herein. For example, the sensors and/or cameras may be mounted to corresponding mechanical devices such that movement of the mechanical devices corresponds to movement of the respective sensors and/or cameras. The mechanical devices may include one or more transducers, one or more actuators, one or more gears, one or more ratchets, one or more cams, one or more levers, one or more springs, one or more rollers, one or more motors, one or more robotic arms, and/or the like. The mechanical devices may be controlled via one or more wired or wireless communication signals from the vehicle analysis platform. In this way, the vehicle analysis platform may control the one or more mechanical devices to adjust a position of the sensors and/or cameras such that measurements can be captured from various locations within the inspection bay and/or that images can be captured from various locations within the inspection bay, including within an interior compartment (e.g., a cabin compartment, a console compartment, a trunk, under a hood, and/or the like) of the vehicle. Accordingly, the vehicle analysis platform can control the mechanical devices to permit the cameras to capture images of the vehicle from different angles and/or distances from the vehicle. As described herein, an image of a vehicle may include an image (or representation) of the entire vehicle or an image of a portion of the vehicle.

In some implementations, the vehicle analysis platform may cause the mechanical devices to interact with one or more devices of the vehicle (e.g., buttons, knobs, levers, pedals, and/or the like) to cause the vehicle or a component of the vehicle to perform an operation (e.g., open a door, open a window, activate a media system, activate indicators, activate windshield wipers, and/or the like). In this way, the vehicle analysis platform may have access to one or more functions of the vehicle to permit the vehicle analysis platform to analyze the function of the vehicle.

As shown in FIG. 1A, and by reference number 110, a vehicle enters an inspection bay. The inspection bay may be any area, room, building, and/or the like that is outfitted to include one or more components of the vehicle analysis platform. Accordingly, the inspection bay may include any suitable support structure (e.g., pillars, beams, walls, a ceiling, and/or the like) capable of mounting the one or more components associated with the vehicle analysis platform.

The vehicle may be an operator-controlled vehicle, an autonomous vehicle, and/or a semi-autonomous vehicle. In some implementations, the vehicle analysis platform may control the vehicle (or cause the vehicle to be controlled) to enter the inspection bay. Additionally, or alternatively, the vehicle analysis platform may control mechanical devices of the inspection bay (e.g., indicators, conveyors, lifts, tracks, belts, and/or the like) to position the vehicle within the inspection bay for analysis.

In this way, the vehicle may enter the inspection bay to permit the vehicle analysis platform to analyze the vehicle and/or determine a condition of the vehicle.

As further shown in FIG. 1A, and by reference number 120, the vehicle analysis platform detects the vehicle using information from the sensors and/or the cameras. For example, the vehicle analysis platform may monitor, via the sensors and/or the cameras, the inspection bay to detect the vehicle. In some implementations, the vehicle analysis platform may detect the vehicle in the inspection bay according to one or more signals from the sensors and a mapping of certain signals that indicate the presence of a vehicle. Additionally, or alternatively, the vehicle analysis platform may use images from the cameras in combination with an object detection model (e.g., a model configured to perform image processing to detect a vehicle).

In some implementations, the vehicle analysis platform may determine dimensions (e.g., length, width, height) of the vehicle (or components of the vehicle) based on measurements from the sensors and/or images from the cameras. The vehicle analysis platform may control the mechanical devices to move the sensors and/or cameras based on the dimensions of the vehicle. Accordingly, using the dimensions, the vehicle analysis platform may position the sensors and/or the cameras at optimal locations (e.g., according to a mechanical control model and/or the model for vehicle analysis) to generate measurement data (e.g., sense mechanical characteristics of the vehicle) and/or capture images of the vehicle. In some implementations, the vehicle analysis platform may use the dimensions of the vehicle (e.g., relative to a coordinate mapping of the inspection bay) to ensure that the mechanical devices, sensors, and/or cameras, when controlling the mechanical devices, do not collide with the vehicle. In some implementations, the vehicle analysis platform may use the determined dimensions as a feature of the vehicle to identify a make/model of the vehicle, as described herein.

In some implementations, based on detecting that the vehicle is in the inspection bay, the vehicle analysis platform may activate the sensors, cameras, and/or mechanical devices to generate analysis data associated with the vehicle. Such analysis data may include measurement data (which may be referred to herein as "measurements") from the sensors and/or image data (which may be referred to herein as "images") from the cameras. For example, the vehicle analysis platform may cause the mechanical devices to move the cameras to positions or locations that permit images to be captured from various angles that provide images of internal elements of the vehicle (e.g., a steering wheel, a dashboard, a display console, a passenger area, a cargo/trunk area, and/or the like), and/or angles that provide images of external elements of the vehicle (e.g., doors, bumpers, roof panels, undercarriage components, and/or the like). Additionally, or alternatively, the vehicle analysis platform may cause the mechanical devices to move the sensors to positions to permit the sensors to measure one or more characteristics of an environment of an internal compartment of the vehicle and/or one or more characteristics of an external environment of the vehicle.

In this way, the vehicle analysis platform may detect the vehicle from measurements of the sensors and/or from images captured by the cameras to permit the vehicle analysis platform to analyze the vehicle.

As shown in FIG. 1B, and by reference number 130, the vehicle analysis platform determines the condition of the vehicle based on a visual analysis and/or an operational analysis. As shown, the vehicle analysis platform may receive images from cameras 1 to N (N≥1) and sensors 1 to M (M≥1). The vehicle analysis platform of example implementation(s) 100 may include a visual analysis module and an operational analysis module. The visual analysis module may use an object identification model, a feature identification model, and a blemish detection model to determine a visual condition of the vehicle. The operational analysis module may use a mechanical operation model, an acoustic analysis model, and a performance analysis model to determine an operational condition of the vehicle. The models of the vehicle analysis platform may be configured in a manner similar to the model for vehicle analysis described herein.

As described herein, the visual analysis module is configured to analyze visual characteristics of the vehicle to determine a visual condition of the vehicle. The visual analysis module may calculate a visual score associated with the vehicle based on analyses performed by the object identification model, the feature identification model, and/or the blemish detection model. The visual score may be calculated based on variances between images of the vehicle and images of other related vehicles (e.g., vehicles that are a same make/model) that may be included in reference information obtained by the vehicle analysis platform.

The object identification model may be configured to detect and/or identify a vehicle as described herein. For example, when analyzing images from the cameras, the vehicle analysis platform may use a computer vision technique, such as a convolutional neural network technique, to assist in classifying a detected vehicle into a particular class (e.g., type, size, make/model, and/or the like). In some implementations, the class may indicate that a particular make/model has a particular visual condition (e.g., include a particular type or number of blemishes, such as dents, scratches, and/or the like), the class may indicate that a particular make/model does not have a particular visual condition (e.g., does not include a particular type of blemish), and/or the like.

In some implementations, the reference information may be obtained based on identifying the make/model of the vehicle. For example, based on identifying the make/model of the vehicle, the vehicle analysis platform may request and/or retrieve reference information associated with the make/model from a data structure of the vehicle analysis platform and/or an external platform (e.g., a web-based platform, a third-party platform, and/or the like). Such reference information for the vehicle may include manufacturer information, specification information, value information, and/or the like.

The feature identification model may be configured to detect and/or identify one or more features (e.g., visual features, technology features, and/or the like) of the vehicle. For example, the one or more features may include one or more of an identifier of the vehicle, a make of the vehicle, a model of the vehicle, a year of manufacture of the vehicle, a technology of the vehicle, a type of the vehicle, and/or the like. For example, the objection identification model may be configured to identify a make/model indicator such as a brand, a name, an identification number (e.g., a vehicle identification number or license plate number), and/or the like. In such a case, the feature identification model may be used by the vehicle analysis platform to determine certain components or parts of the vehicle (e.g., a bumper, a windshield, and/or the like) that are to be analyzed to permit the vehicle analysis platform to move the cameras to capture images of that location. Similar to the object identification model, the feature identification model may use a computer vision technique to classify one or more features of the vehicle in a particular class. In some implementations, the feature identification model may be configured for a specific make/model of the vehicle. Accordingly, once the object identification model identifies the make/model of the vehicle, the visual analysis module may select and/or utilize a corresponding feature identification model to identify and/or analyze features of the vehicle.

The blemish detection model may be configured to detect and/or identify blemishes on the vehicle. The blemish detection model may be configured to detect certain types of blemishes (e.g., scratches, dents, deterioration/corrosion, and/or the like). Additionally, or alternatively, the blemish detection model may be configured to detect blemishes on certain or specific features identified by the feature identification model. Similar to the object identification model and/or the feature identification model, the blemish detection model may use a computer vision technique to detect a blemish and/or classify one or more features of the vehicle as including a blemish. In some implementations, the blemish detection model may be configured to determine or calculate an overall blemish area (e.g., a percentage of the vehicle that includes or is associated with a blemish).

As an example, the vehicle analysis platform may determine that past identified blemishes (e.g., scratches, dents, and/or the like), types of blemishes, and/or numbers of blemishes in images of a vehicle are associated with a threshold probability of being indicative of a poor visual condition of the vehicle. In this case, the vehicle analysis platform may determine that a low visual score (which may translate to a low visual score) is to be assigned to vehicles that have the same or similar blemishes, types of blemishes, or numbers of blemishes as previously analyzed vehicles. In contrast, the vehicle analysis platform may determine that a lack of blemishes or fewer blemishes identified in images of the vehicle, when compared to images of previously analyzed vehicles, corresponds to a high visual score, and thus may assign a high visual score to a vehicle when the images indicate that the vehicle does not include blemishes or includes fewer blemishes than images of previously analyzed vehicles.

In some implementations, the vehicle analysis platform may determine, using a linear regression technique, that a threshold percentage of representations of the vehicle (or representations of parts of the vehicle), in a set of representations of the vehicle, may not be associated with including blemishes, and may determine that those representations are to receive relatively high visual condition scores (e.g., indicating that the vehicle or component of the vehicle is in good visual condition). In contrast, the vehicle analysis platform may determine that another threshold percentage of representations of the vehicle, from a set of representations of the vehicle, are determined to have blemishes and may assign a relatively low visual condition score to those representations. Based on the number of representations of the vehicle that include one or more blemishes, the vehicle analysis platform may determine the visual condition score of the vehicle (e.g., using a sum of the scores, a weighted sum of the scores, and/or the like). In some implementations, the visual condition score may be calculated as a weighted sum of visual scores for various parts (e.g., vehicle interior components and/or vehicle exterior components) of the vehicle. In some implementations, a visual score for the roof of a vehicle may be given less weight than a visual score for a side panel or bumper of the vehicle (e.g., because the roof of the vehicle is typically less apparent to an individual than a side panel or bumper of the vehicle).

As described herein, the operational analysis module is configured to analyze operational characteristics of the vehicle to determine an operational condition of the vehicle. The operational analysis module may calculate an operational score associated with the vehicle based on analyses performed by the performance analysis model, the acoustic analysis model, and/or the air/exhaust analysis model. The operational score may be calculated based on variances between measurements of the vehicle and measurements of other vehicles that may be included in the reference information obtained by the vehicle analysis platform. As described herein, the vehicle analysis platform may cause the mechanical devices to move the sensors around the exterior of the vehicle and/or to internal compartments of the vehicle to sense characteristics of an environment of the internal components. The operational analysis module may use measurements corresponding to the sensed characteristics to determine the operational condition of the vehicle.

The performance analysis model may be configured to determine one or more performance characteristics of the vehicle. Such performance characteristics may be included within one or more measurements (e.g., performance measurements) captured or sensed by the sensors. For example, one of the sensors may include a dynamometer that interacts with the vehicle (e.g., via a tire of the vehicle) to measure a power output from the vehicle. Additionally, or alternatively, the one or more sensors may measure one or more of a pressure, a temperature, and/or the like associated with an engine of the vehicle. In some implementations, the one or more sensors may include or be associated with a diagnostic tool configured to read diagnostic information associated with the vehicle. Such diagnostic information may indicate any relevant maintenance issues or requirements associated with the vehicle. In some implementations, the diagnostic tool and/or analysis may be performed based on a visual analysis (e.g., using the object identification model) of a dashboard of the vehicle having an activated indicator (e.g., a check engine light). The performance analysis model may be configured to generate a score based on the analyzed performance to permit the operational analysis module to determine an operational condition (or operational score) of the vehicle.

The acoustic analysis model may be configured to determine one or more mechanical characteristics of the vehicle. For example, a microphone may be positioned to measure sound and/or detect distinct noises associated with the vehicle. The microphone can be situated within a passenger area of the vehicle, near an engine of the vehicle, and/or the like. The acoustic analysis module may analyze audio data associated with the sound and/or the distinct noises using one or more audio analysis techniques (e.g., using signature analysis, decibel analysis, and/or the like). For example, the acoustic analysis model may be configured to detect relatively high pitch squeaking from the engine (indicating a loose or damaged belt), a hum from one or more electronic components of the vehicle (e.g., indicating potential failure), and/or the like. Accordingly, based on such an analysis, the acoustic analysis model can determine or provide an acoustic score (e.g., for an operational score) associated with the vehicle.

The air/exhaust analysis model may be configured to determine one or more emission characteristics, mechanical characteristics, and/or environmental characteristics of the vehicle. For example, a gas sensor (configured to detect types of air particulates in an environment) may be configured to sense air content in the passenger area. Based on the determined sensed air content, the air/exhaust analysis model may determine a composition of air of the passenger area (e.g., to detect scents associated with cigarette smoking residue, soiled interior, and/or the like). Further, a gas sensor may be configured to detect a probability that the vehicle is leaking any fluids or whether certain seals of the vehicle may be releasing certain vapors that can be detected by the gas sensor. For example, the gas sensor may be configured to sense gasoline vapors, oil vapors, coolant vapors, and/or any other vapors that may be emanating from the vehicle due to a possible leak. In some implementations, a gas sensor can be placed near an exhaust pipe of the vehicle to sense emissions (e.g., carbon emissions) from the vehicle. For example, the gas sensor may be configured to determine whether carbon emissions satisfy a particular threshold (e.g., a government regulated threshold). In this way, through one or more of these analyses, the air/exhaust analysis model may determine one or more emissions characteristics, mechanical characteristics, and/or environment characteristics that can be used to generate an air/exhaust score (e.g., for an operational score) associated with the vehicle.

Accordingly, the vehicle analysis platform may determine, via the model for vehicle analysis, the condition of the vehicle based on one or more characteristics of the vehicle using the one or models described herein. As described herein, the vehicle analysis platform may be configured to determine an overall condition of the vehicle based on the visual score (which is representative of a visual condition of the vehicle) and/or the operational score (which is representative of the operational condition of the vehicle). The vehicle analysis platform may determine an overall condition score based on a combination of the visual score and the operational score, such as a sum of the visual score and operational score, an average of the visual score and operational score, a weighted average of the visual score and operational score, and/or the like. In some implementations, the overall condition score may be calculated based on the make/model of the vehicle and/or one or more other characteristics of the vehicle (e.g., other visual characteristics, operational characteristics, mechanical characteristics, and/or the like). Furthermore, the vehicle analysis platform may use the model for vehicle analysis to determine the overall condition of the vehicle. For example, the vehicle analysis platform may train the model based on historical information associated with determining a condition of a plurality of other vehicles (which may be similar to the vehicle or a same make/model of the vehicle) based on various sets of visual scores and/or operational scores.

As described herein, the vehicle analysis platform may perform one or more actions based on the determined condition of the vehicle. In some implementations, the vehicle analysis platform may generate a report associated with the vehicle. Such a report may reflect and/or include the results of analyses performed by the models of FIG. 1B. Additionally, or alternatively, the vehicle analysis platform may send a notification and/or an alert to a particular entity (or a device of the entity) based on the condition of the vehicle. For example, if the vehicle analysis platform determines that an emissions measurement exceeds a threshold emissions measurement, the vehicle analysis platform may notify respective authorities (e.g., a governmental entity that regulates emissions standards for vehicles). In some implementations, the vehicle analysis platform may determine which entities are to be notified based on a location associated with the vehicle (e.g., a location of the inspection bay, a location of an address registered to the vehicle, and/or the like).

In some implementations, performing the action may include obtaining supplemental information associated with the vehicle. For example, the vehicle analysis platform may obtain value information, market information, ownership information, and/or the like from one or more external platforms that are communicatively coupled with the vehicle analysis platform.

In some implementations, the vehicle analysis platform may be used to monitor and/or control operations associated with autonomous vehicles. Accordingly, assuming the vehicle of example implementation(s) 100 is an autonomous vehicle, the vehicle analysis platform may control the vehicle according to the determined condition of the vehicle. For example, if the vehicle analysis platform determines that a condition of the vehicle (e.g., a visual condition, an operational condition, and/or the like) satisfies a threshold that indicates that the vehicle is to receive maintenance (e.g., to remove blemishes, fix mechanical issues, improve performance, and/or the like), the vehicle analysis platform may control the autonomous vehicle to move to a particular location for maintenance (which can be performed automatically by one or more robotic maintenance devices according to a report generated by the vehicle analysis platform as described herein). In some implementations, the vehicle analysis platform may designate an autonomous vehicle as inoperable (e.g., if an operational score exceeds a threshold operational score). In such cases, the vehicle analysis platform may annotate a record associated with the autonomous vehicle (e.g., a record in a data structure used by an entity to manage a fleet of autonomous vehicles). Additionally, or alternatively, the vehicle analysis platform may shut down or disable the autonomous vehicle (or cause the autonomous vehicle to be shut down or disabled).

As indicated above, FIGS. 1A and 1B are provided as one or more examples. Other examples may differ from what is described with regard to FIGS. 1A and 1B.

Figure 2:
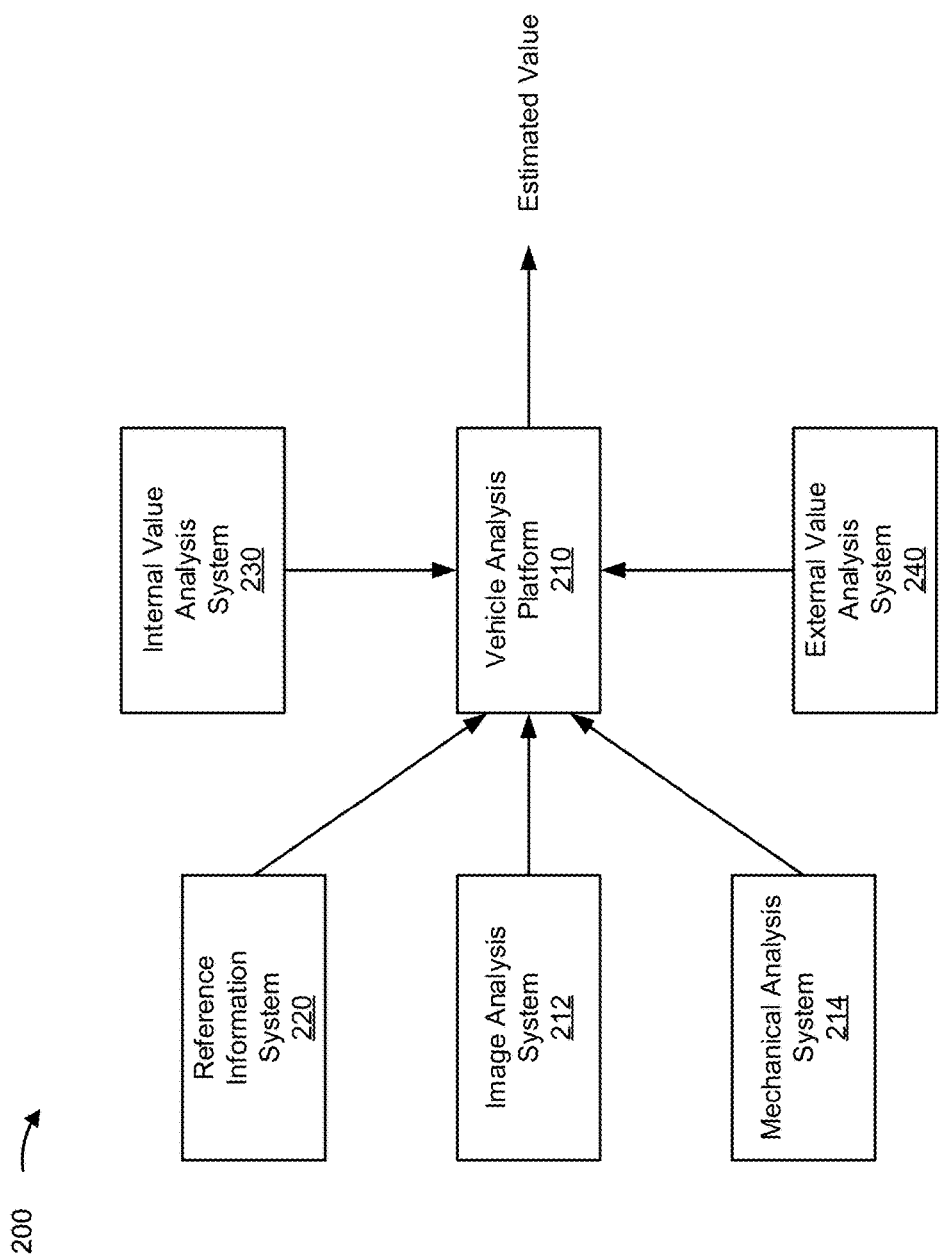

FIG. 2 is a diagram of an example implementation 200 described herein. Example implementation 200 includes a vehicle analysis platform 210, image analysis system 212, mechanical analysis system 214, reference information system 220, internal value analysis system 230, and external value analysis system 240. Vehicle analysis platform 210 may correspond to the vehicle analysis platform of example implementation(s) 100.

Image analysis system 212 may include the visual analysis module, the mechanical devices, and/or the cameras of example implementation(s) 100. Mechanical analysis system 214 may include operational analysis module, the mechanical devices, and/or the sensors of example implementation(s) 100. Reference information system 220 may include a data structure and/or platform associated with vehicle analysis platform 210 that stores reference information for a plurality of vehicles that may be analyzed as described herein. The reference information system 220 may be associated with a particular entity of the vehicle. For example, the reference information system may be a web-based platform (e.g., a website, an online portal, and/or the like) associated with a manufacturer of the identified vehicle. In some implementations, vehicle analysis platform 210 obtains the reference information based on identifying the manufacturer from the one or more features of the vehicle (e.g., as indicated in information from image analysis system 212). Additionally, or alternatively, vehicle analysis platform 210 may provide a search query to a search engine (e.g., a search query that indicates a request for reference information associated with a make/model of the vehicle) to cause the search engine to obtain the information and/or provide the reference information to vehicle analysis platform 210. Accordingly, vehicle analysis platform 210 may request reference information system 220 to provide the reference information to vehicle analysis platform 210. In this way, vehicle analysis platform 210 may determine a condition of a vehicle, as described herein, based on information from image analysis system 212, information from mechanical analysis system 214, and/or information from reference information system 220.

In some implementations, vehicle analysis platform 210 may be used in association with a marketplace. For example, vehicle analysis platform 210 may be configured to determine the condition of the vehicle and estimate or calculate a value of the vehicle based on the condition of the vehicle and value information associated with the vehicle. The value information may be received from internal value analysis system 230 and/or external value analysis system 240. Internal value analysis system 230 may determine, generate, and/or maintain value information associated with vehicles that have been analyzed (e.g., in the past) by vehicle analysis platform 210. Such value information may include monetary values of one or more related vehicles, one or more uses of related vehicles (e.g., uses that may be specific to an entity associated with the vehicle analysis platform), and/or the like. External value analysis system 240 may include a third-party valuation platform and/or market analysis platform that provides external monetary value information associated with the vehicle, demand information associated with the vehicle, supply information associated with the vehicle, and/or the like. Therefore, vehicle analysis platform 210 may use value information from internal value analysis system 230 and/or external value analysis system 240 to determine a value (e.g., a monetary value, a usage value) of the vehicle.

In some implementations, based on the vehicle condition and/or one or more other characteristics of the vehicle (e.g., make/model, type, location, and/or the like), vehicle analysis platform 210 may initiate a transaction (e.g., send an offer to purchase the vehicle, list the vehicle for sale, and/or the like) associated with a value (e.g., a transaction for the vehicle at a price based on the value). The vehicle analysis platform may use a valuation model to determine a value score associated with the vehicle. The valuation model may be trained based on value information associated with related vehicles, market information, location information, and/or the like. Accordingly, using the value information and the vehicle condition, the valuation model can determine the value score to permit the vehicle analysis platform to initiate the transaction.

In this way, vehicle analysis platform 210 may use information from a plurality of systems to determine a condition of a vehicle and/or a corresponding value associated with the vehicle to permit vehicle analysis platform 210 to engage in a transaction, control the vehicle, generate a report associated with the vehicle, send a notification and/or an alert associated with the vehicle (e.g., to prompt a corresponding action associated with the vehicle), and/or the like.

Therefore, as described herein, vehicle analysis platform 210 may provide a standard system to objectively determine a condition of a vehicle, determine whether the vehicle is operational, determine whether the vehicle is abiding by one or more regulations, and/or determine a value associated with the vehicle. Furthermore, vehicle analysis platform 210 may provide a single point of reference that can, in real-time, analyze a vehicle to determine the condition, and perform one or more of the above actions based on the condition. Accordingly, vehicle analysis platform 210 may simplify and/or standardize the process to determine a condition of a vehicle without wasting computing resources and/or network resources involved in identifying the vehicle, researching information associated with the vehicle, communicating information associated with the vehicle, and/or the like.

As indicated above, FIG. 2 are provided as one or more examples. Other examples may differ from what is described with regard to FIG. 2.

Figure 3:
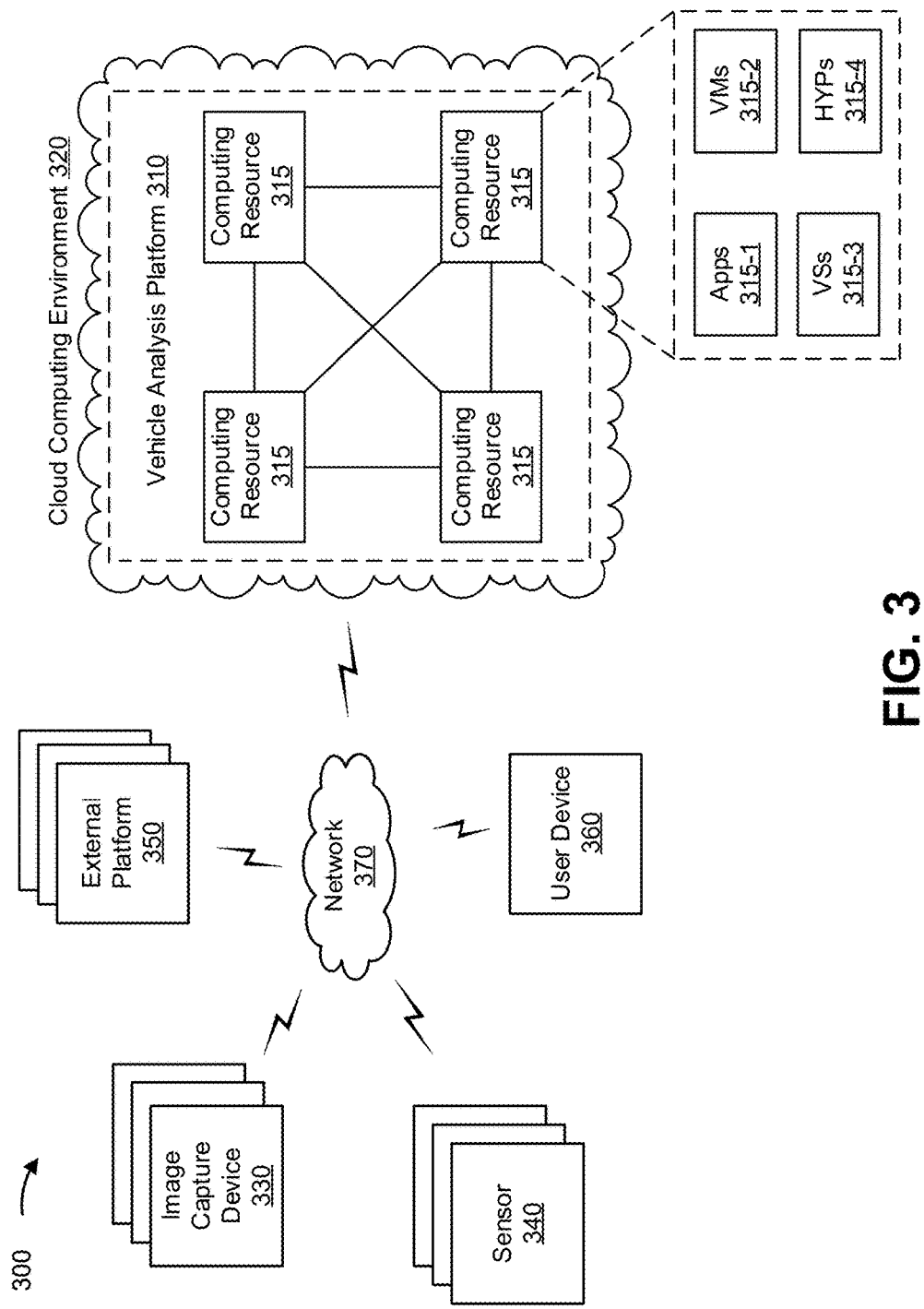
FIG. 3 is a diagram of an example environment in which systems and/or methods described herein may be implemented.

FIG. 3 is a diagram of an example environment 300 in which systems and/or methods, described herein, may be implemented. As shown in FIG. 3, environment 300 may include a vehicle analysis platform 310, a computing resource 315, one or more image capture devices 330 (referred herein individually as "image capture device" 330 or collectively as "image capture devices" 330), one or more sensors 340 (referred herein individually as "sensor 340" or collectedly as "sensors" 340), one or more external platforms 350 (referred herein individually as "external platform" 350 or collectively as "external platforms" 350), a user device 360, and a network 370. Devices of environment 300 may interconnect via wired connections, wireless connections, or a combination of wired and wireless connections.

Vehicle analysis platform 310 includes one or more computing resources assigned to determine a condition of a vehicle as described herein. For example, vehicle analysis platform 310 may be a platform implemented by cloud computing environment 320 that may identify a vehicle, determine a visual condition of the vehicle, determine an operational condition of the vehicle, and perform an action based on the visual condition and/or operational condition. Vehicle analysis platform 310 may correspond to the vehicle analysis platform of example implementation 100 and/or vehicle analysis platform 210 of example implementation 200. In some implementations, vehicle analysis platform 310 is implemented by computing resources 315 of cloud computing environment 320.

Vehicle analysis platform 310 may include a server device or a group of server devices. In some implementations, vehicle analysis platform 310 may be hosted in cloud computing environment 320. Notably, while implementations described herein describe vehicle analysis platform 310 as being hosted in cloud computing environment 320, in some implementations, vehicle analysis platform 310 may be non-cloud-based or may be partially cloud-based.

Cloud computing environment 320 includes an environment that delivers computing as a service, whereby shared resources, services, etc. may be provided to user devices 360. Cloud computing environment 320 may provide computation, software, data access, storage, and/or other services that do not require end-user knowledge of a physical location and configuration of a system and/or a device that delivers the services. As shown, cloud computing environment 320 may include vehicle analysis platform 310 and a computing resource 315.

Computing resource 315 includes one or more personal computers, workstation computers, server devices, or another type of computation and/or communication device. In some implementations, computing resource 315 may host vehicle analysis platform 310. The cloud resources may include compute instances executing in computing resource 315, storage devices provided in computing resource 315, data transfer devices provided by computing resource 315, etc. In some implementations, computing resource 315 may communicate with other computing resources 315 via wired connections, wireless connections, or a combination of wired and wireless connections.

As further shown in FIG. 3, computing resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by user device 360. Application 315-1 may eliminate a need to install and execute the software applications on user device 360. For example, application 315-1 may include software associated with vehicle analysis platform 310 and/or any other software capable of being provided via cloud computing environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system ("OS"). A process virtual machine may execute a single program and may support a single process. In some implementations, virtual machine 315-2 may execute on behalf of a user (e.g., user device 360), and may manage infrastructure of cloud computing environment 320, such as data management, synchronization, or long-duration data transfers.

Virtualized storage 315-3 includes one or more storage systems and/or one or more devices that use virtualization techniques within the storage systems or devices of computing resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as computing resource 315. Hypervisor 315-4 may present a virtual operating platform to the guest operating systems and may manage the execution of the guest operating systems. Multiple instances of a variety of operating systems may share virtualized hardware resources.

Image capture device 330 includes one or more devices configured to capture, generated, and/provide images of a vehicle as described herein. Image capture device 330 may correspond to the cameras of example implementation 100 and/or be included within the image capture system 212 of example implementation 200. Sensor 340 includes one or more devices configured to capture, generate, and/or provide measurements associated with a vehicle as described herein. Sensor 340 may correspond to the sensors of example implementation 100 and/or be included within mechanical analysis system 214 of example implementation 200. External platform 350 includes one or more platforms configured to store, generate, and/or provide information (e.g., reference information, valuation information, and/or the like) associated with a vehicle as described herein. External platforms 350 may correspond to one or more of reference information system 220, internal value analysis system 230, or external value analysis system 240.

User device 360 includes one or more devices capable of receiving, generating, storing, processing, and/or providing information associated with requesting and/or obtaining vehicle information associate with a vehicle analyzed by vehicle analysis platform 310. For example, user device 360 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 370 includes one or more wired and/or wireless networks. For example, network 370 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
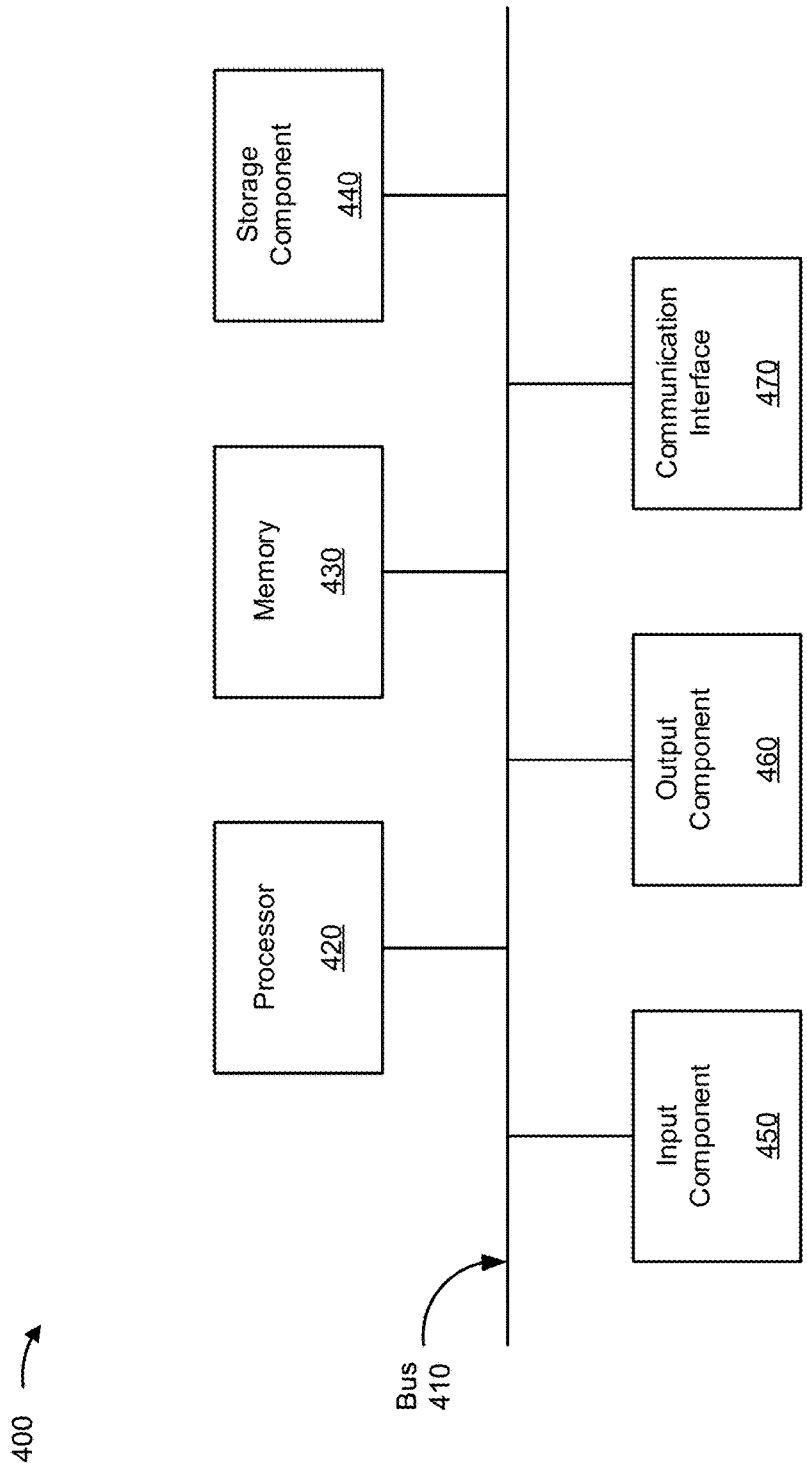
FIG. 4 is a diagram of example components of one or more devices of FIG. 3.

FIG. 4 is a diagram of example components of a device 400. Device 400 may correspond to vehicle analysis platform 310, computing resource 315, image capture device 330, sensor 340, and/or external platform 350. In some implementations, vehicle analysis platform 310, computing resource 315, image capture device 330, sensor 340, and/or external platform 350 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
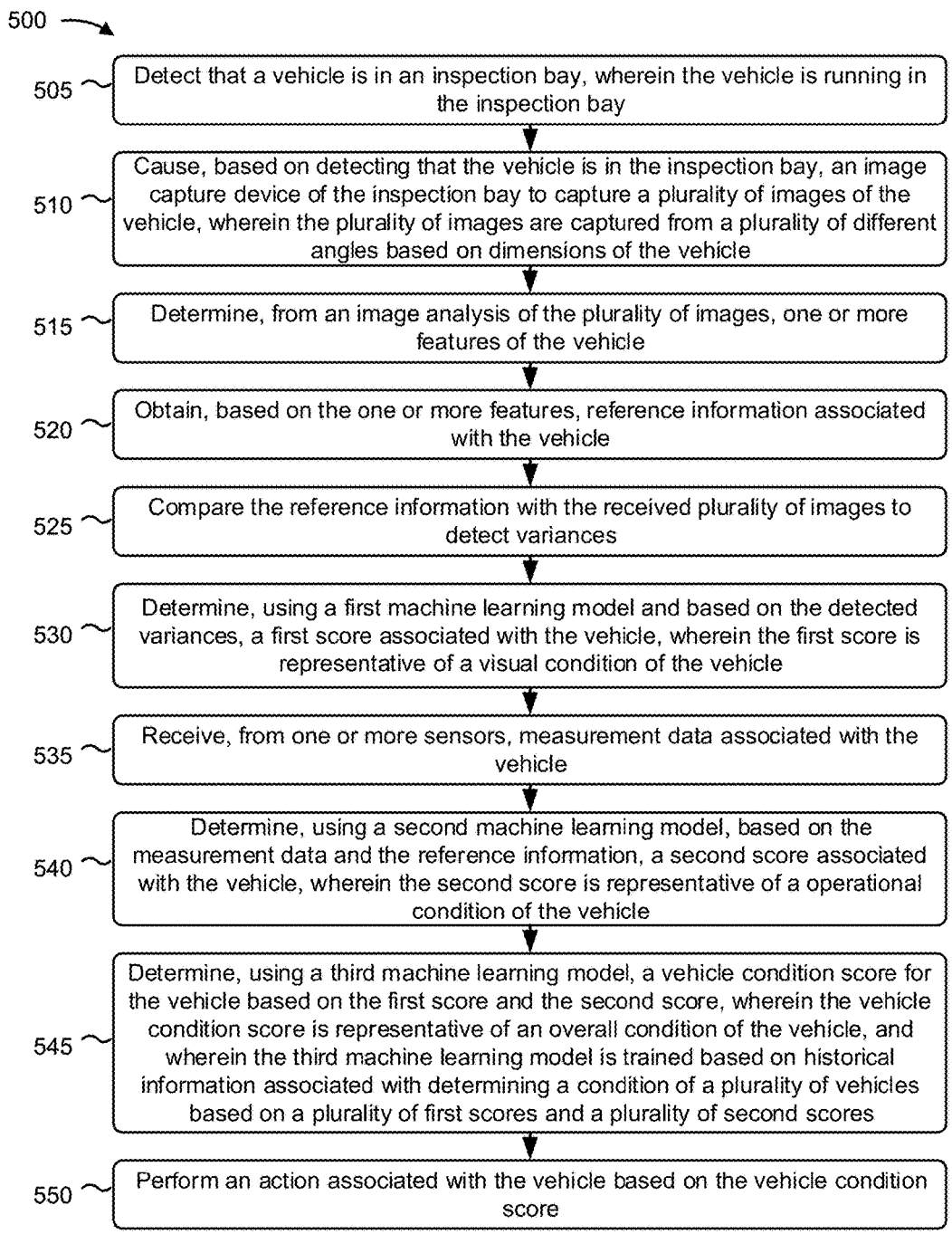
FIGS. 5-7 are flowcharts of one or more example processes associated with a vehicle analysis platform described herein.

FIG. 5 is a flow chart of an example process 500 associated with a value analysis platform described herein. In some implementations, one or more process blocks of FIG. 5 may be performed by a vehicle analysis platform (e.g., vehicle analysis platform 310). In some implementations, one or more process blocks of FIG. 5 may be performed by another device or a group of devices separate from or including vehicle analysis platform, such as a computing resource (e.g., computing resource 315), an image capture device (e.g., image capture device 330), a sensor (e.g., sensor 340), and an external platform (e.g., external platform 350).

As shown in FIG. 5, process 500 may include detecting that a vehicle is in an inspection bay, wherein the vehicle is running in the inspection bay (block 505). For example, the vehicle analysis platform (e.g., using a computing resource 315, a processor 420, a memory 430, a storage component 440, an input component 450, a communication interface 470, and/or the like) may detect that a vehicle is in an inspection bay, as described above. In some implementations, the vehicle is running in the inspection bay.

As further shown in FIG. 5, process 500 may include causing, based on detecting that the vehicle is in the inspection bay, an image capture device of the inspection bay to capture a plurality of images of the vehicle, wherein the plurality of images are captured from a plurality of different angles based on dimensions of the vehicle (block 510). For example, the vehicle analysis platform (e.g., using a computing resource 315, a processor 420, a memory 430, a storage component 440, an output component 460, a communication interface 470, and/or the like) may cause, based on detecting that the vehicle is in the inspection bay, an image capture device of the inspection bay to capture a plurality of images of the vehicle, as described above. In some implementations, the plurality of images are captured from a plurality of different angles based on dimensions of the vehicle.

As shown in FIG. 5, process 500 may include determining, from an image analysis of the plurality of images, one or more features of the vehicle (block 515). For example, the vehicle analysis platform (e.g., using a computing resource 315, processor 420, a memory 430, a storage component 440, an input component 450, and a communication interface 470, and/or the like) may determine, from an image analysis of the plurality of images, one or more features of the vehicle, as described above.

As shown in FIG. 5, process 500 may include obtaining, based on the one or more features, reference information associated with the vehicle (block 520). For example, the vehicle analysis platform (e.g., using a computing resource 315, processor 420, a memory 430, a storage component 440, an input component 450, and a communication interface 470, and/or the like) may obtain, based on the one or more features, reference information associated with the vehicle, as described above.

As shown in FIG. 5, process 500 may include comparing the reference information with the received plurality of images to detect variances (block 525). For example, the vehicle analysis platform (e.g., using a computing resource 315, processor 420, a memory 430, a storage component 440, an input component 450, and a communication interface 470, and/or the like) may compare the reference information with the received plurality of images to detect variances, as described above.

As shown in FIG. 5, process 500 may include determining, using a first machine learning model and based on the detected variances, a first score associated with the vehicle, wherein the first score is representative of a visual condition of the vehicle (block 530). For example, the vehicle analysis platform (e.g., using a computing resource 315, processor 420, a memory 430, a storage component 440, an input component 450, and a communication interface 470, and/or the like) may determine, using a first machine learning model and based on the detected variances, a first score associated with the vehicle, as described above. In some implementations, the first score is representative of a visual condition of the vehicle.

As shown in FIG. 5, process 500 may include receiving, from one or more sensors, measurement data associated with the vehicle (block 535). For example, the vehicle analysis platform (e.g., using a computing resource 315, processor 420, a memory 430, a storage component 440, an input component 450, and a communication interface 470, and/or the like) may receive, from one or more sensors, measurement data associated with the vehicle, as described above.

As shown in FIG. 5, process 500 may include determining, using a second machine learning model, based on the measurement data and the reference information, a second score associated with the vehicle, wherein the second score is representative of an operational condition of the vehicle (block 540). For example, the vehicle analysis platform (e.g., using a computing resource 315, processor 420, a memory 430, a storage component 440, an input component 450, and a communication interface 470, and/or the like) may determine, using a second machine learning model, based on the measurement data and the reference information, a second score associated with the vehicle, as described above. In some implementations, the second score is representative of an operational condition of the vehicle.

As shown in FIG. 5, process 500 may include determining, using a third machine learning model, a vehicle condition score for the vehicle based on the first score and the second score, wherein the vehicle condition score is representative of an overall condition of the vehicle, and wherein the third machine learning model is trained based on historical information associated with determining a condition of a plurality of vehicles based on a plurality of first scores and a plurality of second scores (block 545). For example, the vehicle analysis platform (e.g., using a computing resource 315, processor 420, a memory 430, a storage component 440, an input component 450, and a communication interface 470, and/or the like) may determine, using a third machine learning model, a vehicle condition score for the vehicle based on the first score and the second score, as described above. In some implementations, the vehicle condition score is representative of an overall condition of the vehicle. In some implementations, the third machine learning model is trained based on historical information associated with determining a condition of a plurality of vehicles based on a plurality of first scores and a plurality of second scores.

As shown in FIG. 5, process 500 may include performing an action associated with the vehicle based on the vehicle condition score (block 550). For example, the vehicle analysis platform (e.g., using a computing resource 315, processor 420, a memory 430, a storage component 440, an output component 460, and a communication interface 470, and/or the like) may perform an action associated with the vehicle based on the vehicle condition score, as described above.

Process 500 may include additional implementations, such as any single implementation or any combination of implementations described below and/or in connection with one or more other processes described elsewhere herein.

In some implementations, the one or more features include at least one of: an identifier of the vehicle, a make of the vehicle, a model of the vehicle, a year of manufacture of the vehicle, a feature of the vehicle, or a type of the vehicle.

In some implementations, the measurement data includes air content data received from an air content sensor. In some implementations, the air content sensor is configured to sense one or more of a particular air particulate associated with the vehicle or a quantity of the particular air particulate. In some implementations, the measurement data includes audio data received from a microphone configured to capture an audio signal associated with the vehicle. In some implementations, the measurement data includes diagnostic data received from a diagnostic sensor configured to detect maintenance issues associated with the vehicle. In some implementations, the measurement data includes performance data received from a dynamometer configured to measure a power output from the vehicle. In some implementations, the measurement data includes temperature data received from a temperature sensor or an infrared sensor configured to measure a temperature associated with the vehicle.

In some implementations, the image capture device is configured to be controlled according to one or more mechanical devices. In some implementations, causing the image capture device to capture the plurality of images comprises controlling the one or more mechanical devices to position the image capture device at the plurality of different angles relative to the vehicle. In some implementations, the plurality of different angles of the vehicle include at least one of: an angle that permits the image capture device to capture one or more images of internal elements of the vehicle or an angle that permits the image capture device to capture one or more images of external elements of the vehicle.

In some implementations, the vehicle analysis platform, when obtaining the reference information may identify, based on the one or more features, one or more platforms; request, using information identifying the one or more features, the one or more platforms to provide the reference information; and receive, from the platform, the reference information.

In some implementations, the vehicle is an autonomous vehicle and the vehicle analysis platform may determine, based on the vehicle condition score and a threshold vehicle condition score, that the autonomous vehicle is inoperable to perform an operation. In some implementations, the vehicle analysis platform, when performing the action, may comprises at least one of designate the autonomous vehicle as inoperable, store an annotation in a record associated with the autonomous vehicle, transmit navigational instructions to the autonomous vehicle to cause the autonomous vehicle to leave the inspection bay, or cause the autonomous vehicle to shut down.

In some implementations, the vehicle analysis platform, when performing the action, may determine a value score associated with vehicle based on the vehicle condition score and the reference information and initiate, based on the value score, a transaction associated with the vehicle. In some implementations, the vehicle analysis platform, when performing the action, may transmit, to a user device, a notification that alerts a user to the overall condition of the vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
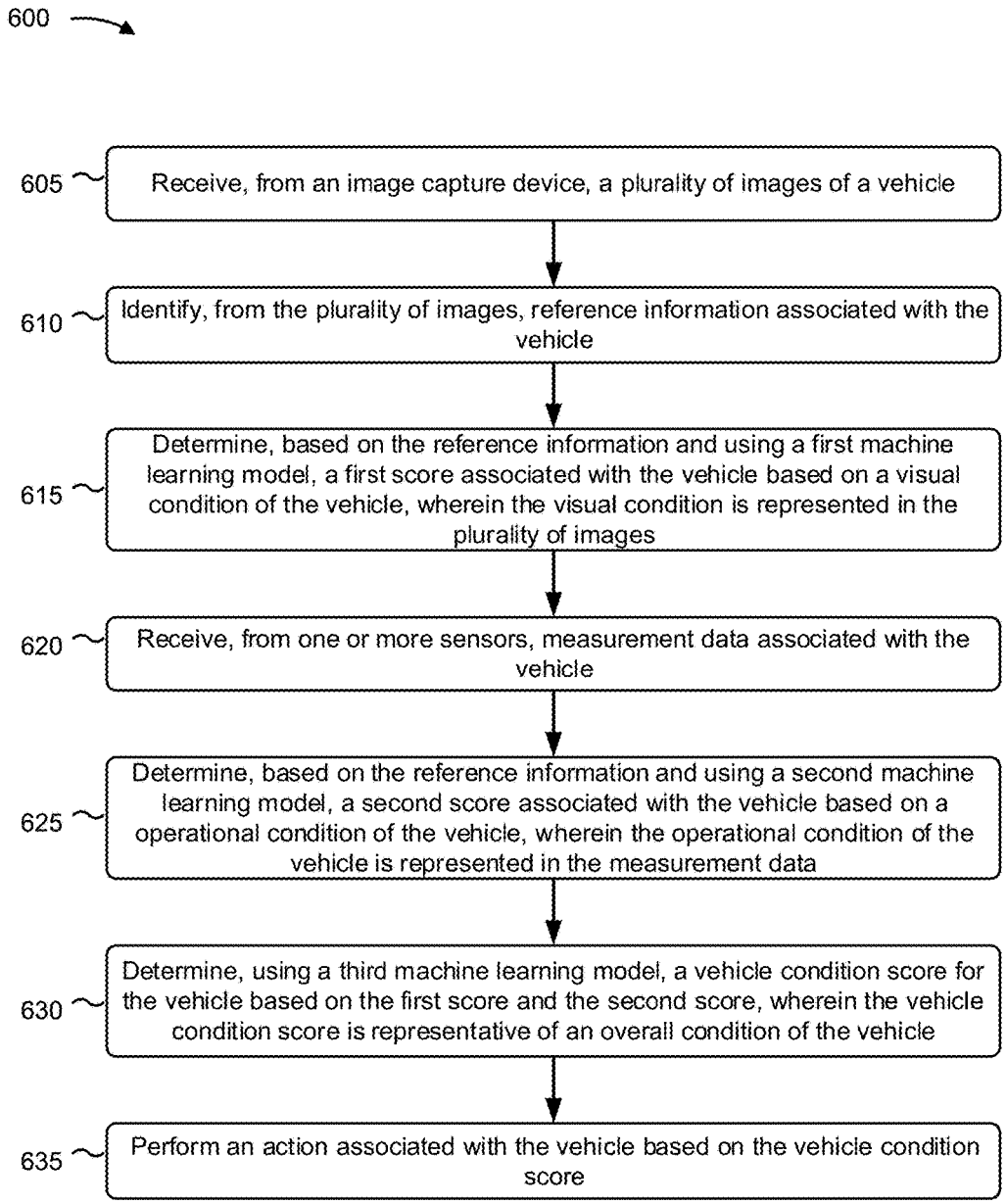

FIG. 6 is a flow chart of an example process 600 associated with a vehicle analysis platform described herein. In some implementations, one or more process blocks of FIG. 6 may be performed by a vehicle analysis platform (e.g., vehicle analysis platform 310). In some implementations, one or more process blocks of FIG. 6 may be performed by another device or a group of devices separate from or including vehicle analysis platform, such as a computing resource (e.g., computing resource 315), an image capture device (e.g., image capture device 330), a sensor (e.g., sensor 340), and an external platform (e.g., external platform 350).

As shown in FIG. 6, process 600 may include receiving, from an image capture device, a plurality of images of a vehicle (block 605). For example, the vehicle analysis platform (e.g., using a computing resource 315, processor 420, a memory 430, a storage component 440, an input component 450, and a communication interface 470, and/or the like) may receive, from an image capture device, a plurality of images of a vehicle, as described above.

As further shown in FIG. 6, process 600 may include identifying, from the plurality of images, reference information associated with the vehicle (block 610). For example, the vehicle analysis platform (e.g., using a computing resource 315, processor 420, a memory 430, a storage component 440, an input component 450, and a communication interface 470, and/or the like) may identify, from the plurality of images, reference information associated with the vehicle, as described above.

As further shown in FIG. 6, process 600 may include determining, based on the reference information and using a first machine learning model, a first score associated with the vehicle based on a visual condition of the vehicle, wherein the visual condition is represented in the plurality of images (block 615). For example, the vehicle analysis platform (e.g., using a computing resource 315, processor 420, a memory 430, a storage component 440, an input component 450, and a communication interface 470, and/or the like) may determine, based on the reference information and using a first machine learning model, a first score associated with the vehicle based on a visual condition of the vehicle, as described above. In some implementations, the visual condition is represented in the plurality of images.

As further shown in FIG. 6, process 600 may include receiving, from one or more sensors, measurement data associated with the vehicle (block 620). For example, the vehicle analysis platform (e.g., using a computing resource 315, processor 420, a memory 430, a storage component 440, an input component 450, and a communication interface 470, and/or the like) may receive, from one or more sensors, measurement data associated with the vehicle, as described above.

As further shown in FIG. 6, process 600 may include determining, based on the reference information and using a second machine learning model, a second score associated with the vehicle based on an operational condition of the vehicle, wherein the operational condition of the vehicle is represented in the measurement data (block 625). For example, the vehicle analysis platform (e.g., using a computing resource 315, processor 420, a memory 430, a storage component 440, an input component 450, and a communication interface 470, and/or the like) may determine, based on the reference information and using a second machine learning model, a second score associated with the vehicle based on an operational condition of the vehicle, as described above. In some implementations, the operational condition of the vehicle is represented in the measurement data.

As further shown in FIG. 6, process 600 may include determining, using a third machine learning model, a vehicle condition score for the vehicle based on the first score and the second score, wherein the vehicle condition score is representative of an overall condition of the vehicle (block 630). For example, the vehicle analysis platform (e.g., using a computing resource 315, processor 420, a memory 430, a storage component 440, an input component 450, and a communication interface 470, and/or the like) may determine, using a third machine learning model, a vehicle condition score for the vehicle based on the first score and the second score, as described above. In some implementations, the vehicle condition score is representative of an overall condition of the vehicle.

As further shown in FIG. 6, process 600 may include performing an action associated with the vehicle based on the vehicle condition score (block 635). For example, the vehicle analysis platform (e.g., using a computing resource 315, processor 420, a memory 430, a storage component 440, an output component 460, and a communication interface 470, and/or the like) may perform an action associated with the vehicle based on the vehicle condition score, as described above.

Process 600 may include additional implementations, such as any single implementation or any combination of implementations described below and/or in connection with one or more other processes described elsewhere herein.

In some implementations, the vehicle analysis platform may monitor, via at least one of the image capture device or the one or more sensors, an inspection bay; detect, based on one or more images of the plurality of images or a signal from the one or more sensors, that the vehicle is in an inspection bay; and cause, based on detecting that the vehicle is in the inspection bay, at least one of the image capture device or the one or more sensors to provide the plurality of images or the measurement data.

In some implementations, the first machine learning model is trained to identify the one or more features using an image analysis. In some implementations, the image analysis is configured to permit the first machine learning model to identify at least one of the one or more features of the vehicle, or a blemish of the vehicle based on a reference image associated with the vehicle. In some implementations, the reference image associated with the vehicle is included in the reference information.

In some implementations, the third machine learning model is trained based on at least one of: the vehicle, the reference information, the vehicle condition score, the first score, the second score, the action performed, or historical information associated with one or more vehicles that are associated with the vehicle.

In some implementations, the vehicle is an autonomous vehicle. In some implementations, the vehicle analysis platform may determine that the vehicle condition score satisfies a threshold vehicle condition score that indicates that the autonomous vehicle is inoperable to perform an operation. In some implementations, the one or more processors, when performing the action, are configured to least one of: designate the autonomous vehicle as inoperable by storing an annotation in a record associated with the autonomous vehicle, transmit navigational instructions to the autonomous vehicle to cause the autonomous vehicle to leave the inspection bay, or cause the autonomous vehicle to shut down.

In some implementations, the action involves an activity that is to be performed by the vehicle. In some implementations, the vehicle analysis platform, when performing the action, may cause the vehicle to perform the activity at a particular location or suspend an operation of the vehicle to prevent the vehicle from performing the activity.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
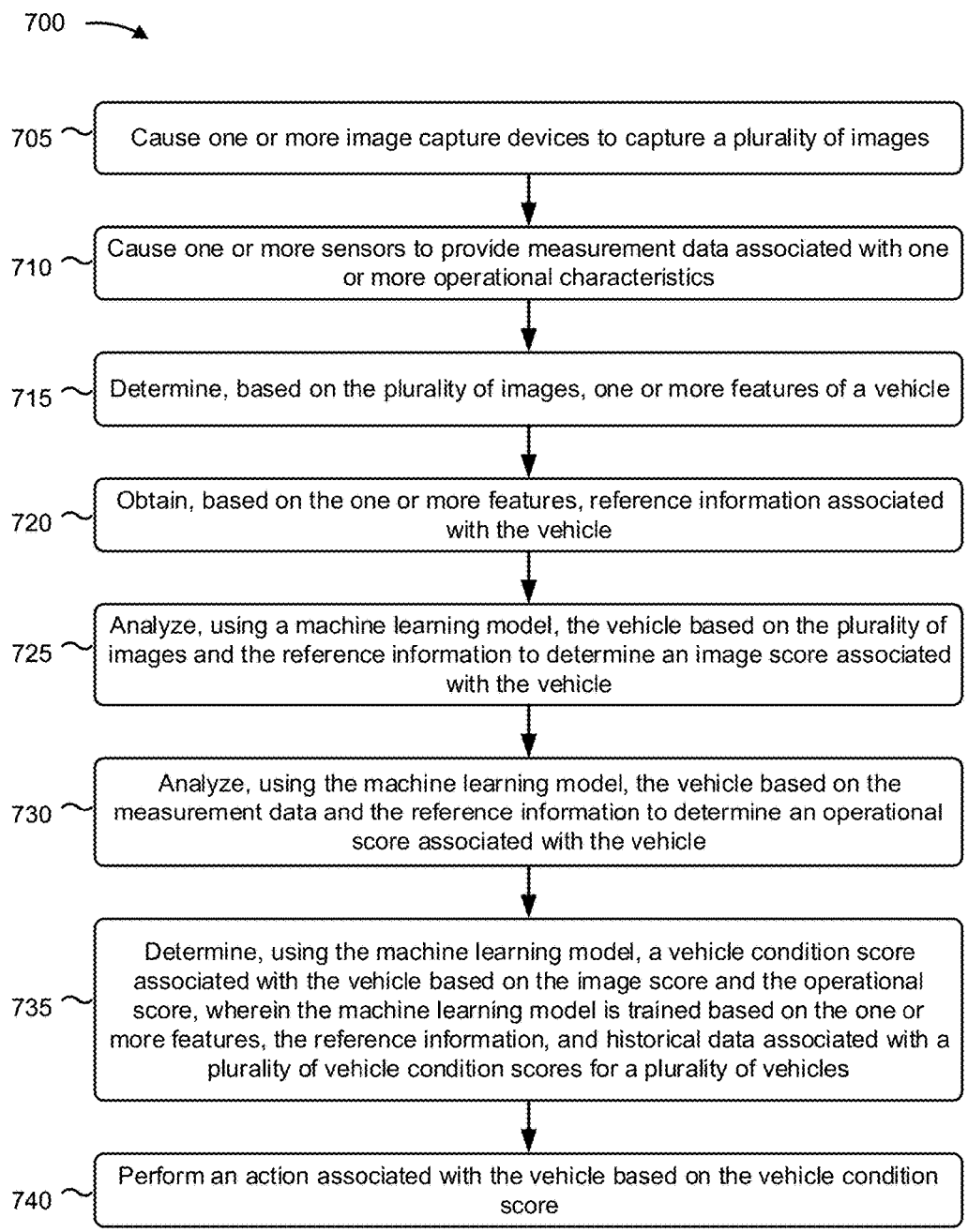

FIG. 7 is a flow chart of an example process 700 associated with a value analysis platform described herein. In some implementations, one or more process blocks of FIG. 7 may be performed by a vehicle analysis platform (e.g., vehicle analysis platform 310). In some implementations, one or more process blocks of FIG. 7 may be performed by another device or a group of devices separate from or including vehicle analysis platform, such as a computing resource (e.g., computing resource 315), an image capture device (e.g., image capture device 330), a sensor (e.g., sensor 340), and an external platform (e.g., external platform 350).

As shown in FIG. 7, process 700 may include causing one or more image capture devices to capture the plurality of images (block 705). For example, the vehicle analysis platform (e.g., using a computing resource 315, processor 420, a memory 430, a storage component 440, an output component 460, and a communication interface 470, and/or the like) may cause one or more image capture devices to capture the plurality of images, as described above.

As shown in FIG. 7, process 700 may include causing one or more sensors to provide measurement data associated with one or more operational characteristics (block 710). For example, the vehicle analysis platform (e.g., using a computing resource 315, processor 420, a memory 430, a storage component 440, an output component 460, and a communication interface 470, and/or the like) may cause the one or more sensors to provide measurement data associated with one or more operational characteristics, as described above.

As shown in FIG. 7, process 700 may include determining, based on the plurality of images, one or more features of a vehicle (block 715). For example, the vehicle analysis platform (e.g., using a computing resource 315, processor 420, a memory 430, a storage component 440, an input component 450, and a communication interface 470, and/or the like) may determine, based on the plurality of images, one or more features of a vehicle, as described above.

As shown in FIG. 7, process 700 may include obtaining, based on the one or more features, reference information associated with the vehicle (block 720). For example, the vehicle analysis platform (e.g., using a computing resource 315, processor 420, a memory 430, a storage component 440, an input component 450, and a communication interface 470, and/or the like) may obtain, based on the one or more features, reference information associated with the vehicle, as described above.

As shown in FIG. 7, process 700 may include analyzing, using a machine learning model, the vehicle based on the plurality of images and the reference information to determine an image score associated with the vehicle (block 725). For example, the vehicle analysis platform (e.g., using a computing resource 315, processor 420, a memory 430, a storage component 440, an input component 450, and a communication interface 470, and/or the like) may analyzing, using a machine learning model, the vehicle based on the plurality of images and the reference information to determine an image score associated with the vehicle, as described above.

As shown in FIG. 7, process 700 may include analyzing, using the machine learning model, the vehicle based on the measurement data and the reference information to determine an operational score associated with the vehicle (block 730). For example, the vehicle analysis platform (e.g., using a computing resource 315, processor 420, a memory 430, a storage component 440, an input component 450, and a communication interface 470, and/or the like) may analyzing, using the machine learning model, the vehicle based on the measurement data and the reference information to determine an operational score associated with the vehicle, as described above.

As shown in FIG. 7, process 700 may include determining, using the machine learning model, a vehicle condition score associated with the vehicle based on the image score and the operational score, wherein the machine learning model is trained based on the one or more features, reference information, and historical data associated with a plurality of vehicle condition scores for a plurality of vehicles (block 735). For example, the vehicle analysis platform (e.g., using a computing resource 315, processor 420, a memory 430, a storage component 440, an input component 450, and a communication interface 470, and/or the like) may determine, using the machine learning model, a vehicle condition score associated with the vehicle based on the image score and the operational score, as described above. In some implementations, the machine learning model is trained based on the one or more features, the reference information, and historical data associated with a plurality of vehicle condition scores for a plurality of vehicles.

As shown in FIG. 7, process 700 may include performing an action associated with the vehicle based on the vehicle condition score (block 740). For example, the vehicle analysis platform (e.g., using a computing resource 315, processor 420, a memory 430, a storage component 440, an output component 460, and a communication interface 470, and/or the like) may perform an action associated with the vehicle based on the vehicle condition score, as described above.

Process 700 may include additional implementations, such as any single implementation or any combination of implementations described below and/or in connection with one or more other processes described elsewhere herein.

In some implementations, the vehicle analysis platform may monitor at least one of the one or more image capture devices or the one or more sensors and determine, using information from the one or more image capture devices or the one or more sensors, that the vehicle is in an inspection bay.

In some implementations, the vehicle analysis platform, when obtaining the reference information, may provide a search query to a search engine. In some implementations, the search query includes at least one of the one or more features. In some implementations, the vehicle analysis platform may receive, from the search engine, the reference information.

In some implementations, vehicle analysis platform may control one or more mechanical devices to position at least one image capture device at a plurality of different angles relative to the vehicle. In some implementations, a set of the plurality of images are captured from the plurality of different angles. In some implementations, the one or more mechanical devices are connected to at least one sensor of the one or more sensors. In some implementations, the vehicle analysis platform may control the one or more mechanical devices to move the at least one sensor to permit the at least one sensor to detect at least one of the one or more operational characteristics of the vehicle.

In some implementations, the vehicle analysis platform, when performing the action, may determine, using another machine learning model, a value score associated with the vehicle based on the vehicle condition score and the reference information and may initiate, based on the value score, a transaction associated with the vehicle.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   detecting, by a device, that a vehicle is in an inspection bay,
      wherein the vehicle is running in the inspection bay;
   causing, by the device and based on detecting that the vehicle is in the inspection bay, an image capture device of the inspection bay to capture a plurality of images of the vehicle,
      wherein the plurality of images are captured from a plurality of different angles based on dimensions of the vehicle;
   determining, by the device and from an image analysis of the plurality of images, one or more features of the vehicle;
   obtaining, by the device and based on the one or more features, reference information associated with the vehicle;
   comparing the reference information with the plurality of images to detect variances;
   determining, using a first machine learning model and based on the detected variances, a first score associated with the vehicle,
      wherein the first score is representative of a visual condition of the vehicle;
   receiving, by the device and from one or more sensors, measurement data associated with the vehicle;
   determining, by the device and using a second machine learning model, based on the measurement data and the reference information, a second score associated with the vehicle,
      wherein the second score is representative of an operational condition of the vehicle;
   determining, by the device and using a third machine learning model, a vehicle condition score for the vehicle based on the first score and the second score,
      wherein the vehicle condition score is representative of an overall condition of the vehicle, and
      wherein the third machine learning model is trained based on historical information associated with determining a condition of a plurality of vehicles based on a plurality of first scores and a plurality of second scores; and
   performing, by the device, an action associated with the vehicle based on the vehicle condition score.

2. The method of claim 1, wherein the one or more features include at least one of:
   an identifier of the vehicle,
   a make of the vehicle,
   a model of the vehicle,
   a year of manufacture of the vehicle,
   a feature of the vehicle, or
   a type of the vehicle.

3. The method of claim 1, wherein the measurement data includes at least one of:
   air content data received from an air content sensor,
      wherein the air content sensor is configured to sense one or more of a particular air particulate associated with the vehicle or a quantity of the particular air particulate,
   audio data received from a microphone configured to capture an audio signal associated with the vehicle, diagnostic data received from a diagnostic sensor configured to detect maintenance issues associated with the vehicle, performance data received from a dynamometer configured to measure a power output from the vehicle, or temperature data received from a temperature sensor or an infrared sensor configured to measure a temperature associated with the vehicle.

4. The method of claim 1, wherein the image capture device is configured to be controlled according to one or more mechanical devices, wherein causing the image capture device to capture the plurality of images comprises:
controlling the one or more mechanical devices to position the image capture device at the plurality of different angles relative to the vehicle,
wherein the plurality of different angles of the vehicle include at least one of:
an angle that permits the image capture device to capture one or more images of internal elements of the vehicle, or
an angle that permits the image capture device to capture one or more images of external elements of the vehicle.

5. The method of claim 1, wherein obtaining the reference information comprises:
identifying, based on the one or more features, one or more platforms;
requesting, using information identifying the one or more features, the one or more platforms to provide the reference information; and
receiving, from the platform, the reference information.

6. The method of claim 1, wherein the vehicle is an autonomous vehicle, the method further comprising:
determining, based on the vehicle condition score and a threshold vehicle condition score, that the autonomous vehicle is inoperable to perform an operation,
wherein performing the action comprises at least one of:
designating the autonomous vehicle as inoperable,
storing an annotation in a record associated with the autonomous vehicle,
transmitting navigational instructions to the autonomous vehicle to cause the autonomous vehicle to leave the inspection bay, or
causing the autonomous vehicle to shut down.

7. The method of claim 1, wherein performing the action, comprises:
determining a value score associated with vehicle based on the vehicle condition score and the reference information; and
initiating, based on the value score, a transaction associated with the vehicle.

8. The method of claim 1, wherein performing the action comprises transmitting, to a user device, a notification that alerts a user to the overall condition of the vehicle.

9. A device, comprising:
a memory; and
one or more processors operatively coupled to the memory, the memory and the one or more processors configured to:
receive, from an image capture device, a plurality of images of a vehicle;
identify, from the plurality of images, reference information associated with the vehicle;
determine, based on the reference information and using a first machine learning model, a first score associated with the vehicle based on a visual condition of the vehicle,
wherein the visual condition is represented in the plurality of images;
receive, from one or more sensors, measurement data associated with the vehicle;
determine, based on the reference information and using a second machine learning model, a second score associated with the vehicle based on an operational condition of the vehicle,
wherein the operational condition of the vehicle is represented in the measurement data;
determine, using a third machine learning model, a vehicle condition score for the vehicle based on the first score and the second score,
wherein the vehicle condition score is representative of an overall condition of the vehicle; and
perform an action associated with the vehicle based on the vehicle condition score.

10. The device of claim 9, wherein the one or more processors are further to:
monitor, via at least one of the image capture device or the one or more sensors, an inspection bay;
detect, based on one or more images of the plurality of images or a signal from the one or more sensors, that the vehicle is in the inspection bay; and
cause, based on detecting that the vehicle is in the inspection bay, at least one of the image capture device or the one or more sensors to provide the plurality of images or the measurement data.

11. The device of claim 9, wherein the first machine learning model is trained to identify the one or more features using an image analysis,
wherein the image analysis is configured to permit the first machine learning model to identify at least one of:
the one or more features of the vehicle, or
a blemish of the vehicle based on a reference image associated with the vehicle,
wherein the reference image associated with the vehicle is included in the reference information.

12. The device of claim 9, wherein the third machine learning model is trained based on at least one of:
the vehicle,
the reference information,
the vehicle condition score,
the first score,
the second score,
the action performed, or
historical information associated with one or more vehicles that are associated with the vehicle.

13. The device of claim 9, wherein the vehicle is an autonomous vehicle, and
wherein the one or more processors are further configured to:
determine that the vehicle condition score satisfies a threshold vehicle condition score that indicates that the autonomous vehicle is inoperable to perform an operation, and
wherein the one or more processors, when performing the action, are configured to least one of:
designate the autonomous vehicle as inoperable by storing an annotation in a record associated with the autonomous vehicle, transmit navigational instructions to the autonomous vehicle to cause the autonomous vehicle to leave the inspection bay, or cause the autonomous vehicle to shut down.

14. The device of claim 9, wherein the action involves an activity that is to be performed by the vehicle, wherein the one or more processors, when performing the action, are configured to:

cause the vehicle to perform the activity at a particular location, or suspend an operation of the vehicle to prevent the vehicle from performing the activity.

15. A system configured to analyze a vehicle, the system comprising:

one or more image capture devices configured to capture a plurality of images of the vehicle;

one or more sensors configured to detect one or more operational characteristics of the vehicle; and one or more control devices configured to:

cause the one or more image capture devices to capture the plurality of images;

cause the one or more sensors to provide measurement data associated with the one or more operational characteristics;

determine, based on the plurality of images, one or more features of the vehicle;

obtain, based on the one or more features, reference information associated with the vehicle;

analyze, using a machine learning model, the vehicle based on the plurality of images and the reference information to determine an image score associated with the vehicle;

analyze, using the machine learning model, the vehicle based on the measurement data and the reference information to determine an operational score associated with the vehicle;

determine, using the machine learning model, a vehicle condition score associated with the vehicle based on the image score and the operational score, wherein the machine learning model is trained based on the one or more features, the reference information, and historical data associated with a plurality of vehicle condition scores for a plurality of vehicles; and perform an action associated with the vehicle based on the vehicle condition score.

16. The system of claim 15, wherein the one or more control devices are further configured to:

monitor at least one of the one or more image capture devices or the one or more sensors; and determine, using information from the one or more image capture devices or the one or more sensors, that the vehicle is in an inspection bay.

17. The system of claim 15, wherein the one or more control devices, when obtaining the reference information, are configured to:

provide a search query to a search engine, wherein the search query includes at least one of the one or more features; and receive, from the search engine, the reference information.

18. The system of claim 15, wherein the system further comprises:

one or more mechanical devices, wherein at least one image capture device of the one or more image capture devices is connected to the one or more mechanical devices, and wherein the one or more control devices are configured to:

control the one or more mechanical devices to position the at least one image capture device at a plurality of different angles relative to the vehicle, wherein a set of the plurality of images are captured from the plurality of different angles.

19. The system of claim 18, wherein the one or more mechanical devices are connected to at least one sensor of the one or more sensors, wherein the one or more control devices are configured to:

control the one or more mechanical devices to move the at least one sensor to permit the at least one sensor to detect at least one of the one or more operational characteristics of the vehicle.

20. The system of claim 15, wherein the one or more control devices, when performing the action, are to:

determine, using another machine learning model, a value score associated with the vehicle based on the vehicle condition score and the reference information; and initiate, based on the value score, a transaction associated with the vehicle.

* * * * *